United States Patent
Kapadia (10) Patent No.: US 11,615,449 B2
(45) Date of Patent: *Mar. 28, 2023

(54) VOICE CHECK-IN PLATFORM WITH SERVERLESS COMPUTING ARCHITECTURE

(71) Applicant: SOHAM INC, Bellevue, WA (US)

(72) Inventor: Chaitanya Kapadia, Union City, CA (US)

(73) Assignee: SOHAM INC., Bellevue, WA (US)

(*) Notice: Subject to any disclaimer, the term of this patent is extended or adjusted under 35 U.S.C. 154(b) by 793 days.

This patent is subject to a terminal disclaimer.

(21) Appl. No.: 16/408,109

(22) Filed: May 9, 2019

(65) Prior Publication Data

US 2020/0202260 A1 Jun. 25, 2020

Related U.S. Application Data

(60) Provisional application No. 62/784,048, filed on Dec. 21, 2018.

(51) Int. Cl.
G06Q 10/02 (2012.01)
G06Q 30/0601 (2023.01)
(Continued)

(52) U.S. Cl.
CPC ....... *G06Q 30/0613* (2013.01); *G01C 21/367* (2013.01); *G06F 1/08* (2013.01);
(Continued)

(58) Field of Classification Search
None
See application file for complete search history.

(56) References Cited

U.S. PATENT DOCUMENTS 7,693,735 B2  4/2010 Carmi et al.
8,244,566 B1* 8/2012 Coley ................ G06Q 10/109
                                                    705/7.11

(Continued)

FOREIGN PATENT DOCUMENTS

AU  2016102125 A4  2/2017
CN  106096576 A    11/2016
(Continued)

OTHER PUBLICATIONS

Amazon Web Services, Amazon API Gateway Developer Guide, copyrighted 2015 and available to the public Jul. 14, 2015 as captured by web.archive.org, p. 101-102 (Year: 2015).

(Continued)

*Primary Examiner* — Tonya Joseph
(74) *Attorney, Agent, or Firm* — BakerHostetler (57) ABSTRACT

A voice check-in platform includes a salon application associated with a voice capable device, wherein a user requests via voice an appointment for a salon service. The platform includes a location service in communication with the salon application for finding a salon nearby a user; a salon services API in communication with the salon application for finding a requested salon service and time for appointment for the salon; and a database interface responding to a request for making an appointment with the salon. A method of using a voice check-in platform includes instructions, when executed by a processor, that cause the processor to execute actions including: receiving, by a first processor, a request received via an associated voice capable device for booking an appointment for a service provided by a salon, wherein the first processor is a processor of a device, the device includes machine readable memory accessible by the first processor; finding a salon and service, by the first processor in response the request; prompting, by the first processor, a booking for the salon and service via an associated voice capable device; and upon receiving, by the first processor, a confirmation from the user, booking the salon and service.

13 Claims, 5 Drawing Sheets

(51) Int. Cl.
| | |
|---|---|
| H04L 51/02 | (2022.01) |
| G01C 21/36 | (2006.01) |
| G06F 1/08 | (2006.01) |
| G06F 9/38 | (2018.01) |
| G06Q 10/1093 | (2023.01) |
| G06Q 50/00 | (2012.01) |
| G06F 9/54 | (2006.01) |
| G10L 15/22 | (2006.01) |

(52) U.S. Cl.
CPC ............ *G06F 9/3877* (2013.01); *G06F 9/547* (2013.01); *G06Q 10/02* (2013.01); *G06Q 10/1095* (2013.01); *G06Q 50/01* (2013.01); *G10L 15/22* (2013.01); *H04L 51/02* (2013.01); *G10L 2015/223* (2013.01)

(56) References Cited

U.S. PATENT DOCUMENTS

| | | | |
|---|---|---|---|
| 2002/0035493 A1* | 3/2002 | Mozayeny | G06Q 10/109 705/5 |
| 2002/0165926 A1 | 11/2002 | Rensin et al. | |
| 2003/0130882 A1 | 7/2003 | Shuttleworth et al. | |
| 2009/0204753 A1 | 8/2009 | Bridge, Jr. et al. | |
| 2011/0083138 A1 | 4/2011 | Sivasubramanian et al. | |
| 2011/0153375 A1* | 6/2011 | Weinstock | G06Q 50/30 705/5 |
| 2011/0179114 A1 | 7/2011 | Dilip et al. | |
| 2012/0284100 A1* | 11/2012 | Goldberg | G06Q 30/02 705/14.19 |
| 2014/0136262 A1 | 5/2014 | Uzzaman et al. | |
| 2014/0337372 A1 | 11/2014 | Lee et al. | |
| 2016/0092771 A1 | 3/2016 | Buckley et al. | |
| 2016/0335686 A1 | 11/2016 | AthuluruTlrumala et al. | |
| 2017/0132255 A1* | 5/2017 | Gupta | G06Q 50/01 |
| 2017/0374198 A1 | 12/2017 | Silva et al. | |
| 2018/0129971 A1 | 5/2018 | Vlassis et al. | |
| 2019/0103111 A1 | 4/2019 | Tiwari et al. | |
| 2020/0202402 A1 | 6/2020 | Kapadia | |
| 2021/0248521 A1* | 8/2021 | Bright | G06Q 10/02 |

FOREIGN PATENT DOCUMENTS

| | | | | |
|---|---|---|---|---|
| WO | WO-2015077653 A1 * | 5/2015 | | G06Q 30/06 |
| WO | WO 2018/170276 A2 | 9/2018 | | |

OTHER PUBLICATIONS

Parlo, A Charbot for Cutting Hair?, 2016, Medium.com; Retrieved from Internet: URL: https://medium.com/@Parlo/a-chatbot-for-cutting-hair-bcaaab8daad7; p. 1-6 (Year: 2016).

U.S. Patent and Trademark Office, "Non-Final Office Action", U.S. Appl. No. 16/377,939, dated Sep. 4, 2020, 31 pgs.

International Search Report and Written Opinion of the International Searching Authority, PCT/US2019/067934, dated Jun. 29, 2020, 11 pgs.

"Chatbot—Wikipedia", Aug. 11, 2018, XP055638177, retrieved from the internet: URL:https://en.wikipedia.org/w/index.php?title=Chatbot@oldid=854440661 [retrieved on Oct. 31, 2019].

Anonymous: "Amazon Alexa—Wikipedia", Dec. 9, 2018, pp. 1-13, XP055673571, Retrieved from the Internet: URL:https://en.wikipedia.org/w/index.php?title=Amazon_Alexa&oldid=872757295 [retrieved on Mar. 4, 2020].

International Search Report and Written Opinion of the International Searching Authority, PCT/US2019/067982, dated Mar. 16, 2020, 11 pgs.

International Search Report and Written Opinion of the International Searching Authority, PCT/US2019/068003, dated Mar. 20, 2020, 11 pgs.

Michel Meyer: "Alexa—I need a haircut! (demo included)—PresenceAI", May 18, 2018, pp. 1-4, XP055673649, retrieved from the Internet: URL:https://blog.presence.ai/alexa-i-need-a-haircut-demo-included-477c991646ed [retrieved on Mar. 4, 2020].

Parlo: "A Chatbot for Cutting hair?—Parlo—Medium", Sep. 26, 2016, pp. 1-6, XP055673968, retrieved from the internet: URL:https://medium.com/@Parlo/a-chatbot-for-cutting-hair-bcaaab8daad7 [retrieved on Mar. 5, 2020].

Rajan Dr R Arokia Paul: "Serverless Architecture—A Revolution in Cloud Computing", 2018 Tenth International Conference on Advanced Computing (ICOAC), IEEE, Dec. 13, 2018, pp. 88-93, XP033677836, [retrieved on Dec. 20, 2019].

U.S. Patent and Trademark Office, "Final Office Action", U.S. Appl. No. 16/377,939, dated Apr. 30, 2021, 30 pgs.

U.S. Patent and Trademark Office, "Non-Final Office Action", U.S. Appl. No. 16/377,939, dated Dec. 8, 2021, 30 pgs.

"Serverless computing—Wikipedia", Dec. 4, 2018, pp. 1-6, XP055898654, Retrieved from the Internet: URL: https://en.wikipedia.org/w/index.php?title=Serverless_computing&oldid=872030767 [retrieved on Mar. 8, 2022].

Anonymous: "System resource—Wikipedia", Dec. 8, 1918, pp. 1-2, XP055898663, Retrieved from the Internet: URL:https://en.wikipedia.org/w/index.php?title=System_resource&oldid=872735453 [retrieved on Mar. 8, 2022].

European Patent Office, Communication pursuant to Article 94(3) EPC, Application No. 19 848 845.4, dated Mar. 17, 2022, 8 pgs.

Intellectual Property India, Examination Report, Application No. 202137010874, dated Feb. 1, 2022, 8 pgs.

U.S. Patent and Trademark Office, "Non-Final Office Action", U.S. Appl. No. 16/420,700, dated Jan. 21, 2022, 15 pgs.

U.S. Patent and Trademark Office, "Final Office Action", U.S. Appl. No. 16/377,939, dated Mar. 29, 2022, 31 pgs.

"Linked list"; https://web.archive.org/web/20180827154939/https://en.wikipedia.org/wiki/Linked_list; Wikipedia; Aug. 27, 2018; accessed Aug. 9, 2022; 17 pages.

* cited by examiner

VOICE CHECK-IN PLATFORM WITH SERVERLESS COMPUTING ARCHITECTURE

FIELD OF THE DISCLOSURE

The present invention relates generally to a voice check-in platform implemented with serverless computing architecture. The voice check-in platform receives requests by a user via voice to find services and dynamically responds without maintaining a fixed amount of computational resources. The present specification further discloses application management and dynamic databases using the voice check-in platform implemented with serverless computing architecture.

BACKGROUND

Traditionally, salon services are booked specifically with a particular salon with which a user is already familiar and that may or may not have online selection and booking abilities. In many cases, appointments are made by calling the particular salon and requesting an appointment time. Some salons have limited online selection and booking abilities; but, each salon maintains its own bookings, so the user must already know which salon she wishes to visit. Once the user knows which salon the user wants to visit, the user can visit that salon's website, which may or may not have online selection and booking abilities. If the salon does have such abilities, the ability is limited to picking a predefined stylist and/or time for an appointment. If the salon does not have such abilities, the user must call the salon. Currently, there does not exist a tool for using voice to find a salon and make an appointment. Therefore, improvements are desirable.

In addition, traditionally a server is a static set of machines with fixed amount of processors and machine readable memories. With fixed amounts of processors and memories, such a static server has fixed capacities of processing power and memory resources. The fixed capacities are problematic for application developers as well as data centers. Demand for computational resources of an application varies from time to time. For example, when the application was freshly launched to the public, demand for the application may be low. The fixed capacity of the static server may be much greater than the demand, causing waste of capital, time, and human resources to maintain the server. However, after the application is on the market for a period of time, the demand for the application may grow and overwhelm the capacity of the static server, potentially causing jamming or crashing of the server. As such, the traditional static server architecture inevitably mismatches supply and demand, providing either too much or not enough computational resources.

SUMMARY

The embodiments herein disclose voice check-in platforms implemented with serverless computing architecture and application management methods. The voice capable platform analyzes a voice request of a user to find a particular service and presents options to the user for such service. The serverless architecture responds to demand dynamically. The serverless architecture is automatically scalable to match the change of demand, providing no mismatch between demand and supply of computational resources.

This disclosure uses a salon application that uses a voice check-in platform, as an example of an application management. It is noted that the computational architecture disclosed is not limited to a salon application. Other software applications such as finding a car, a house, a restaurant, a nail shop, a movie, a hotel, a service, or the like can all be similarly managed by the voice platform.

A voice check-in platform includes a salon application associated with a voice capable device, wherein a user requests via voice an appointment for a salon service. The platform includes a location service in communication with the salon application for finding a salon nearby a user; a salon services API in communication with the salon application for finding a requested salon service and time for appointment for the salon; and a database interface responding to a request for making an appointment with the salon.

A method of using a voice check-in platform includes instructions, when executed by a processor, that cause the processor to execute actions including: receiving, by a first processor, a request received via an associated voice capable device for booking an appointment for a service provided by a salon, wherein the first processor is a processor of a device, the device includes machine readable memory accessible by the first processor; finding a salon and service, by the first processor in response the request; prompting, by the first processor, a booking for the salon and service via an associated voice capable device; and upon receiving, by the first processor, a confirmation from the user, booking the salon and service.

The present invention relates generally to a voice check-in platform implemented with serverless computing architecture. The platform dynamically responds to service requests without maintaining a fixed amount of computational resources. The present specification further discloses application management using the platform implemented with serverless computing architecture. The platform's serverless database architecture has the benefit of being scalable to match the change of demand. A database center that operates this platform can dynamically allocate computational resources to any client/application whenever there is a need. The computational resources operated by the database center can be efficiently allocated to meet the demands. An application developer who uses the services provided by the database center, does not have to worry about the large amount of hardware investments. There is no need for the application developer to provision a piece of hardware. There is no need for the application developer to increase or decrease the amount of physical hardware to meet the change of the demand. The platform, serverless database is event driven.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

In general, the present disclosure relates to a voice check-in platform for booking salon services through a salon application. The voice check-in system interfaces with a voice capable device that recognizes voice commands, such as Alexa. The user can say to the voice capable device that the user needs to book a salon service, such as a haircut. The voice capable device then interfaces with a salon application running on a serverless backend architecture to start the booking process. If the salon application recognizes the user, for example, by prior use, the salon application can look-up the user and the user's preference to quickly suggest a salon service. If the user is not recognized, the salon application requests additional information from the user through the voice capable device. The user can then select the salon, the stylist and book a time with little effort simply by using voice commands. The user can also cancel an appointment by using voice commands.

Figure 1:
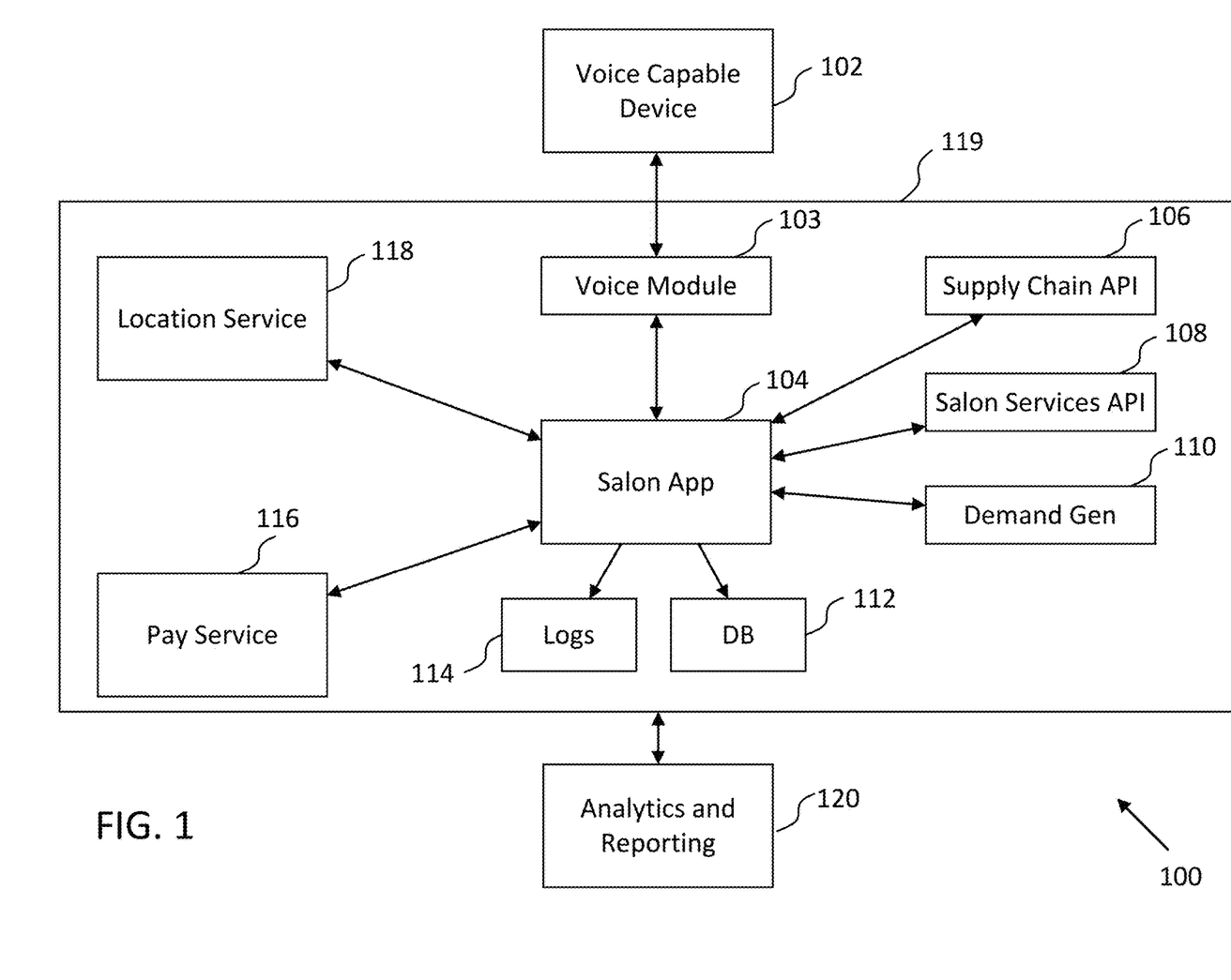
FIG. 1 shows a block diagram of a voice check-in platform using a serverless backend architecture, according to one example embodiment of the disclosure.

FIG. 1 shows a block diagram of a voice-check-in platform 100 using a serverless architecture (hereinafter the "platform") applying to a salon application according to one example embodiment of the disclosure. The arrows in FIG. 1 mean bidirectional data connections between the referred two blocks. A "data connection" is an electronic connection that communicates electronic information, which may include digital and/or analog data. A data connection may be done through a wired connection, e.g., USB, Ethernet, local area network, etc. A data connection may be done through a wireless connection, e.g., IEEE 802.11x (Wi-Fi), long term evolution (4G LTE), or the like. The data connection may be secured, e.g., encrypted, communication. The data connection may be unsecured, e.g., clear text, communication.

The platform 100 includes a voice capable device 102, a voice module 103, a salon application 104, a supply chain API 106, a salon services API 108, a demand generation application 110, a database 112, logs 114, a pay service 116 and a location service 118. The voice capable device 102 can be any device through which the user interacts via voice to express an interest, intent or request for a service. For example, the voice capable device can be an Alexa capable device through which the user communicates via voice its wishes to Alexa. In one embodiment, a user uses Alexa to express a request to book a haircut, shampoo and hair color.

There can be a plurality of salon applications 104 associated with different examples of voice capable devices 102. The salon application 104 communicates with the voice capable device 102. The interest, intent, or need for finding a salon is received by the salon application 104 via the voice capable device 102. The salon application 104 may receive, for example, the identity of the user and the user's location. The identity of the user may come, for example, from an account name of the user for Alexa. Using the above example, the salon application 104 receives the user identification, the request for a haircut, shampoo and color and the current location of the user.

The voice capable device 102 and the salon application 104 may be a single application, according to another example embodiment. For example, the salon application 104 could be a mobile application on a user's mobile device that the user interacts with to convey the user's interest or desire and with which the user gets back information regarding the user's interest or desire. Apple's Siri may also be such an example.

The salon application 104 communicates with the supply chain API 106, the salon services API 108, the demand generation platform 110, the database 112, the logs 114, the pay service 116 and the location service 118. The salon application 104 communicates with the salon service API 108 to find the best matching salon(s) for the user's request. The analysis may include analysis to determine what service(s) the user needs, e.g., haircut, hair dying, hairstyle design, makeup, nail services, etc. The salon application 104 may also consider the location of the user and the potential salons within an area. The salon application may further consider a profile of the user for finding a salon, e.g., an age, a gender, a current hair style, an ethnicity, etc. The salon application may also consider the date and time desired by the user, as well as the availability of a salon for that desired time and date. For example, the user requested to book a haircut, shampoo and color with Alexa, probably intended to find a hair salon nearby the user for the purpose of exploring to make an appointment for a haircut. Alternatively, the user may have intended to use the same stylist, location and time as the user's last booking. The salon application can also mine data from salons to recommend appointments to same stylist, same schedule and same service(s) as previously booked in addition to seeking to sell additional services the user might be interested in.

The salon application 104 also communicates with the location services 118. The location services 118 can find a location of a salon matched by the salon service API 108 or location of a user. The salon service API 108 may keep the updated information of all salons, e.g., the real-time availability of a salon, available service providers of a salon, specialties of a salon, etc. The salon services API 108 could use graph QL to query the API itself. The location services 118 can provide a map, e.g., Google maps, Bing maps, or the like. In one embodiment, the location services 118 may find a plurality of salons within a certain distance from the user. In another embodiment, the location services 118 may find a salon around a location designated by the user.

The salon application 104 returns one or more candidate salons back to the user via the voice capable device 102, along with a stylist and/or time for the user to confirm the booking. If the user confirms the booking, then the salon application 104 communicates with the salon services API 108 to book the appointment. The salon application 104 could also include a list of stylists and/or booking times. The salon application 104 could also recommend a particular stylist or booking time based on underlying data or preferences. The user can then select or confirm choices, for example by picking a salon, a service, a stylist and an appointment time. The salon application 104 also communicates with a pay service 116 to arrange for payment of services or products.

The voice check-in platform runs on and within a serverless backend system 119. The serverless backend system has no physical servers and no instances running; therefore, the code has to be written entirely different than in a server based system. The serverless backend system 119 includes a gateway API. The gateway API controls data throttling, e.g., defining the amount of megabytes per second and rate the serverless backend system is allowed to receive. When the gateway API receives a request to find a salon, it creates one or more caches to handle the request. The gateway API defines the cache size, the data structure of the cache, forward or backward linkings of the cache, and/or time-to-live of data in the cache.

Preferably, the database 112 is a dynamic database. The database 112 does not keep a fixed amount of memory for the salon application 104. The database 112 provisions a space, e.g., a table, when requested by the salon application 104. For example, only when a user requests to make an appointment with a salon, the database 112 creates a table to record the relevant information, e.g., identity of the user, booking date/time, salon location, interested services, interested stylist, etc. Because the database 112 dynamically allocates resources when requested, no unused memory is allocated to the application. In addition, the database 112 uses unstructured data. When an appointment is fulfilled or canceled, the table may be canceled after a certain period of time (time-to-live) according to a data retention policy. Thus, the database 112 is freely scalable (scaling up or down) as the demand of the application changes.

The salon service API 108 may keep the updated information of all salons, e.g., the real-time availability of a salon, available service providers of a salon, specialties of a salon, etc.

Figure 2:
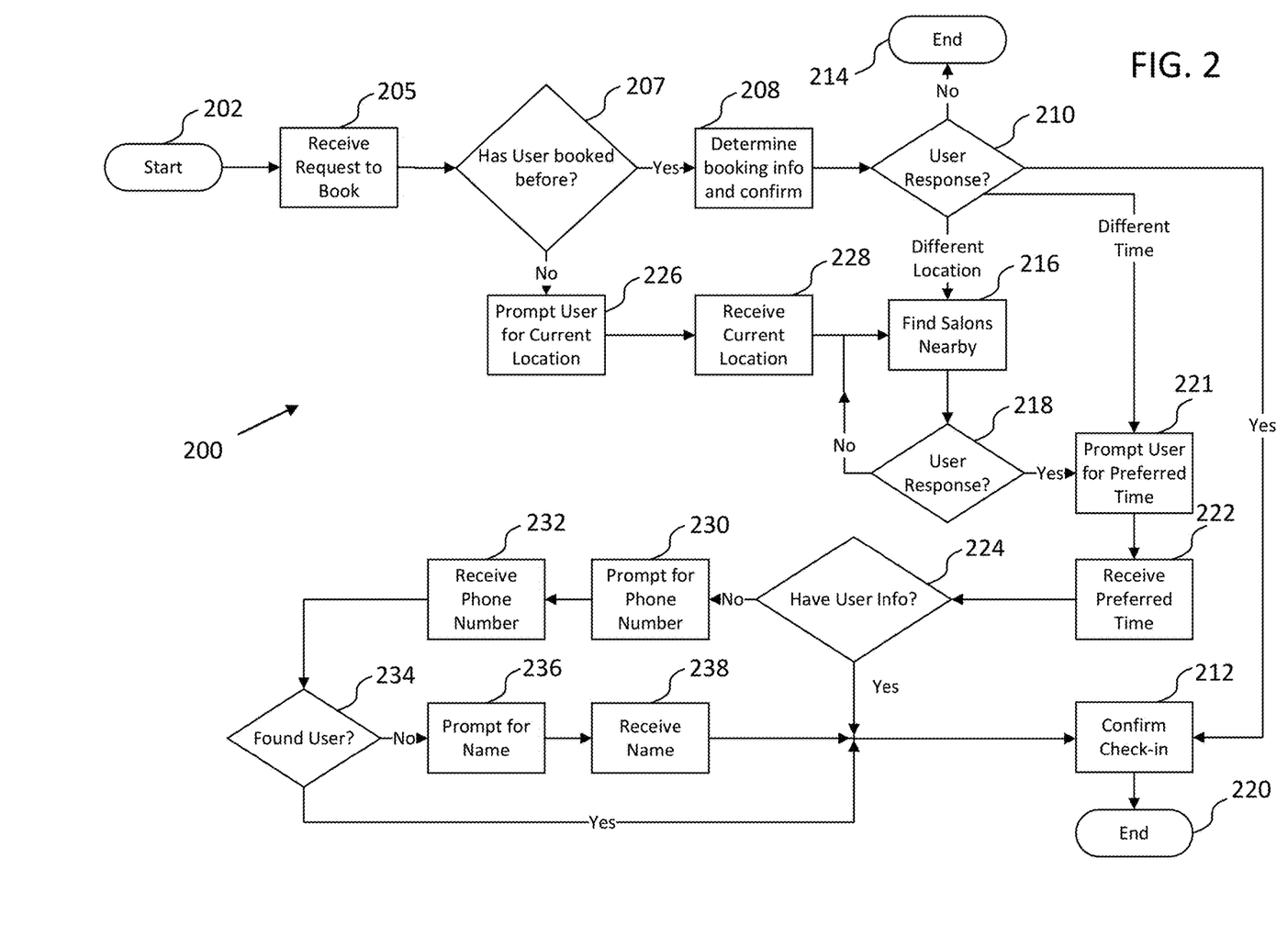
FIG. 2 shows a method of using voice to check-in with a salon that uses a serverless backend architecture, according to one example embodiment of the disclosure.

FIG. 2 shows a method 200 of a voice check-in platform that uses a serverless architecture as a backend system, according to one example embodiment of the disclosure. The method 200 can be executed by a first processor, for example, within the salon application 104 of FIG. 1. The method 200 begins at start 202. The method 200 includes 205 receiving, by a first processor, a request by a user to book an appointment, wherein the processor is accessible by the salon application 104. The request can be received by a voice capable device, such as the voice capable device 102 of FIG. 1. For example, a user may use Alexa to say "Hi Alexa, I need a haircut with shampoo and hair color too." The voice capable device 102 would communicate that request along with a user identification to the salon application 104.

The method 200 further includes 207 determining, by the first processor, if the user has previously checked-in on Alexa by using the user identification. If it is determined by the first processor that the user has, the salon application 104, via the first processor, can 208 look up previous bookings, preferences and salons for the user and communicate with the salon services API to find available bookings matching the criteria. The salon application 104 then submits a response back to the voice capable device 102, for example, "Sure, the first available is an 11 am haircut at Supercuts at the hub. Would you like to check-in?" The method 200 includes 210 determining, by the first processor, how the user responds. If the user responds "Yes", then the salon application 104 can book the appointment through the salon services API 108 and send a message back to the user confirming check-in 212, "Ok David, you're checked in for 11 am the hub Supercuts location". The method ends at 220. Referring back to 210, if the user responds "No", then the method 200 ends at 214.

Referring back to 210, if the user indicates a request for a different location, the salon application 104 can communicate with both the location services 118 and the salon services API 108 to find alternative available salons 216 and send a response back to the user, "I found a few hair salons near you. The first one is Supercuts at the hub which is 0.4 miles away. Does this location work for you?". The method includes 218 determining, by the first processor, a user response. If the user responds "No", the method 200 loops back to find alternative salons nearby at 216. The salon application 104 then prompts the user "Sure, the next is Supercuts on mission St. which is 1.2 miles away. Does this location work for you?". If the user responds "No", then the method 200 circles back again back to 216.

Referring back to 218, if the user responds "Yes", then the salon application 104 prompts 221 the user, "OK, what's your preferred time?". In this example, the user responds "between 11 to 11:30 am" and is received 222 by the salon application 104. The method 200 includes 224 determining, by the first processor, if the user identification is known. In this example, the user identification is known, and the method 200 continues as previously described.

Referring back to 210, if the user indicates a request for a different time, the salon application 104 communicates with the salon services API 108 to find alternative times and asks the user 221 via the voice capable device 102, "OK, what's your preferred time?" and processing continues as previously described.

Referring back to 207, if it is determined, by the first processor, that the user has not previously checked-in on Alexa, the salon application 104 returns to the user and prompts 226, "Sure, what's your current location? You can tell me or use Alexa companion app to send you location." In order to use the latter, native permissions would be requested. The result of either returns a 228 response from the user of a location, such as "Liberty Street, Fremont of 94538". The salon application 104 uses the salon services API 108 to find available services and the location service application 118 to find salons within a certain distance of the user. Processing continues as previously described.

Referring back to 224, if the user identification is not known, then the salon application 104 prompts 230 the user, "Sure, I need some information about you before I check you in. Please provide your phone number with area code, in case Supercuts need to call you about your check-in. In this example, the user 232 responds "425 334 3739". The method continues at 234 to determine, by the first processor if the user's name has been found. If not, the salon application 104 prompts 236 the user its name. The user responds 238 "David New!" and processing continues as previously described. Referring back to 234, if the user's name has been found, then processing continues as previously described.

Figure 3:
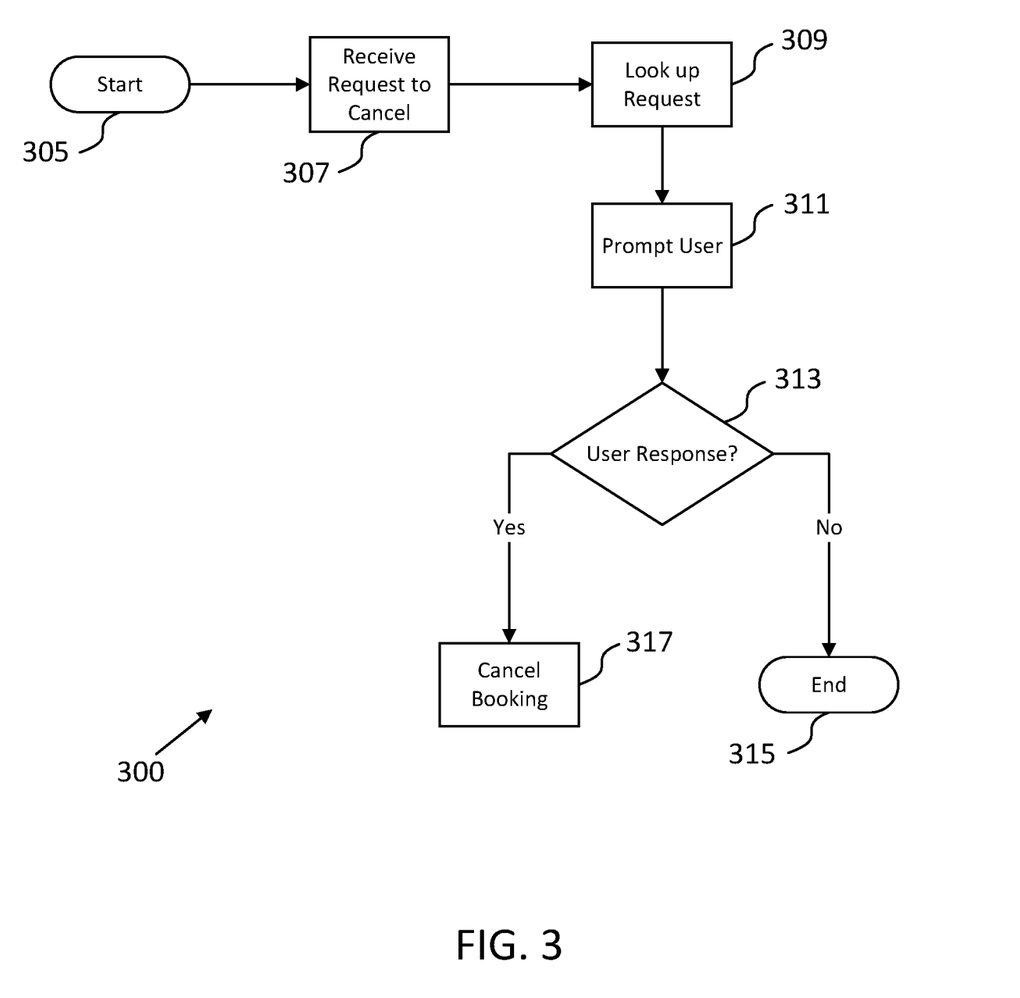
FIG. 3 shows a method of using voice to cancel a check-in with a salon that uses a serverless backend architecture, according to one example embodiment of the disclosure.

FIG. 3 shows a method 300 for cancelling an appointment with a voice check-in platform. The method 300 begins at a start 305. At 307, the voice capable device 102 receives a request to cancel an appointment: "Hi Alexa, can you cancel my check-in at the hub Supercuts location?". The voice capable device 102 communicates the request along with the user identification to the salon application 104. At 309, the salon application 104 communicates with the salon services API 108 to look up the appointment. The salon application 104 communicates back to the voice capable device 102 and prompts the user at 311: "Sure, do you want to cancel your 11 am check-in for a haircut?". The method 300 continues at 313 with determining, by the first processor, if the user agrees to cancel. If the user responds "No", the salon application 104 responds "ok" and processing ends at 315. If the user responds "Yes", the salon application 104 cancels the appointment at 317 through the salon services API 108 and sends a response to the user "Sure. Check-in is cancelled." And processing ends at 315.

Figure 4:
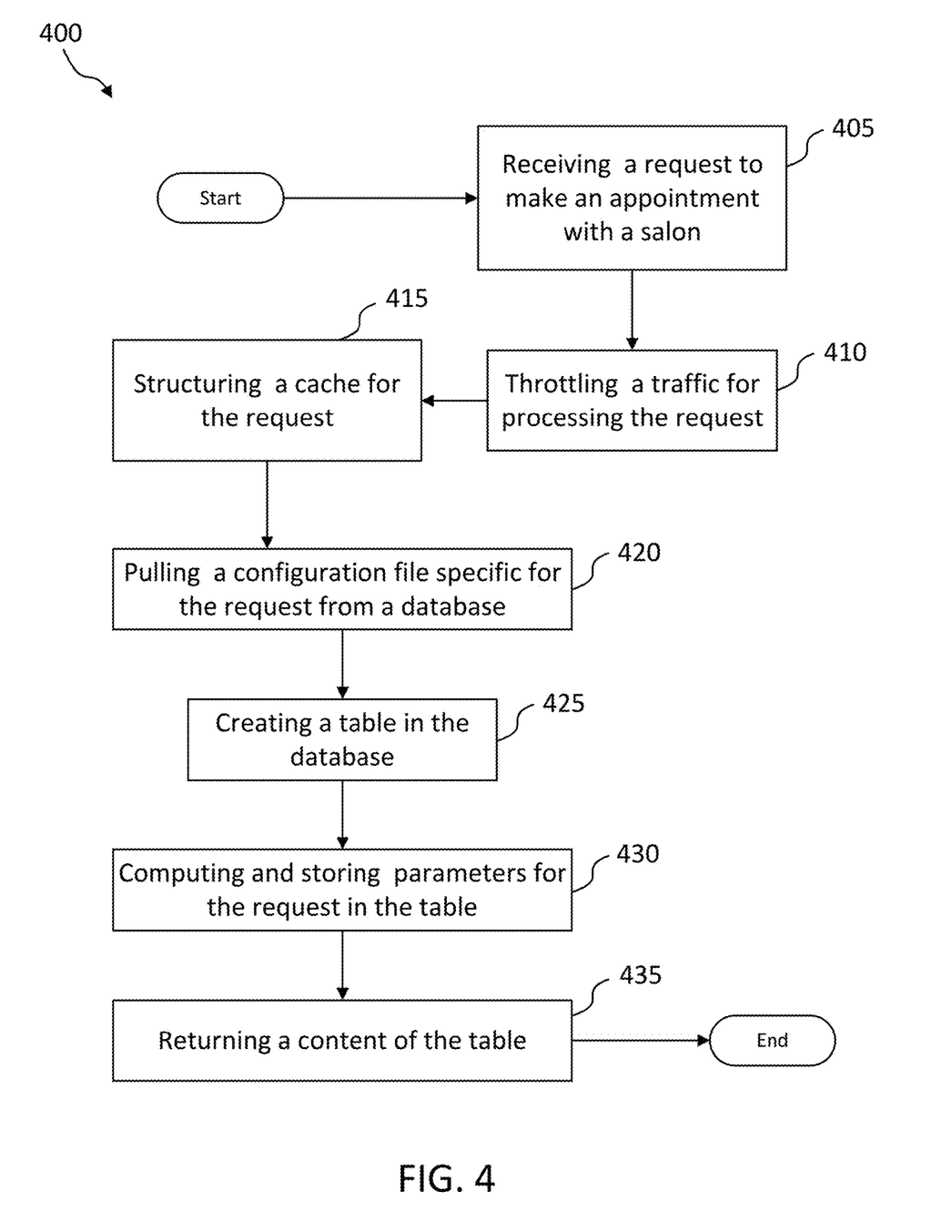
FIG. 4 shows a method of a voice check-in platform that uses a serverless architecture to handle a request from a salon application, according to one example embodiment of the disclosure.

FIG. 4 shows a method 400 for a serverless database handling a request from a salon application according to one embodiment of the disclosure. The method 400 includes 405 receiving, by a second processor of a serverless cloud service system, a request to make an appointment with a salon. The request includes a time, an identity of a client, an identity of a salon, and/or an identity of a stylist. The request is made by a first processor, e.g., a processor of salon application 104, to the second processor, e.g., a processor of a database. In another embodiment, the salon at 405 is a salon that matches the users needs the best.

The method 400 includes 410 throttling, by the second processor, a traffic for processing the request. In one embodiment, the throttling of the traffic includes controlling the amount of megabytes of data allowed per second single direction and/or both directions. In one embodiment, the traffic throttling is done by a gateway API.

The method 400 includes 415 structuring, by the second processor, a cache for the request, wherein the structuring includes sizing a cache, liking caches, defining data retention policy for the cache, or the like. In one embodiment, 415 is executed by the gateway API. In one embodiment, when the gateway API receives a request, the gateway API accesses a cache configuration file from the dynamic database 112. The cache configuration file includes at least one of the following information: a size of the cache, forward and/or backward linking of cache, data retention policy for the cache, data structure of the cache.

The method 400 includes 420 pulling, by the second processor, a configuration file specific for the request from a dynamic database. In one embodiment, the configuration file at 420 may be the cache configuration file as described in 415. In another embodiment, the configuration file can be a configuration file of a table for storing salon appointment information.

The method 400 includes 425 creating, by the second processor, a table in the dynamic database. In one embodiment, the table is specific for storing salon appointment information. The table for storing salon appointment information includes at least one of the following: an identity of the user, a service item (e.g., haircut, hairstyling, hair coloring, manicure, etc.), a price or price range, an identity of a stylist/salon, an identity of a franchise of salon, a location of salon, a time/date for the appointment, a preferred amenity (e.g., parking), etc.

The method 400 includes 430 computing and storing, by the second processor, parameters for the request in the table. In one embodiment, the parameters of the table at 430 are global variables such that inquiries for write/read/search/modify within the database at the global level reveals the parameters (e.g., salon appointment related data).

The method 400 includes 435 returning, by the second processor, a content of the table to the first processor. The content may include the information related to the reservation, e.g., an identity of the user, a service item (e.g., haircut, hairstyling, hair coloring, manicure, etc.), a price or price range, an identity of a stylist/salon, an identity of a franchise of salon, a location of salon, a time/date for the appointment, a preferred amenity (e.g., parking), etc. After receiving the content of the table, the user may further modify, confirm, or cancel the appointment.

Figure 5:
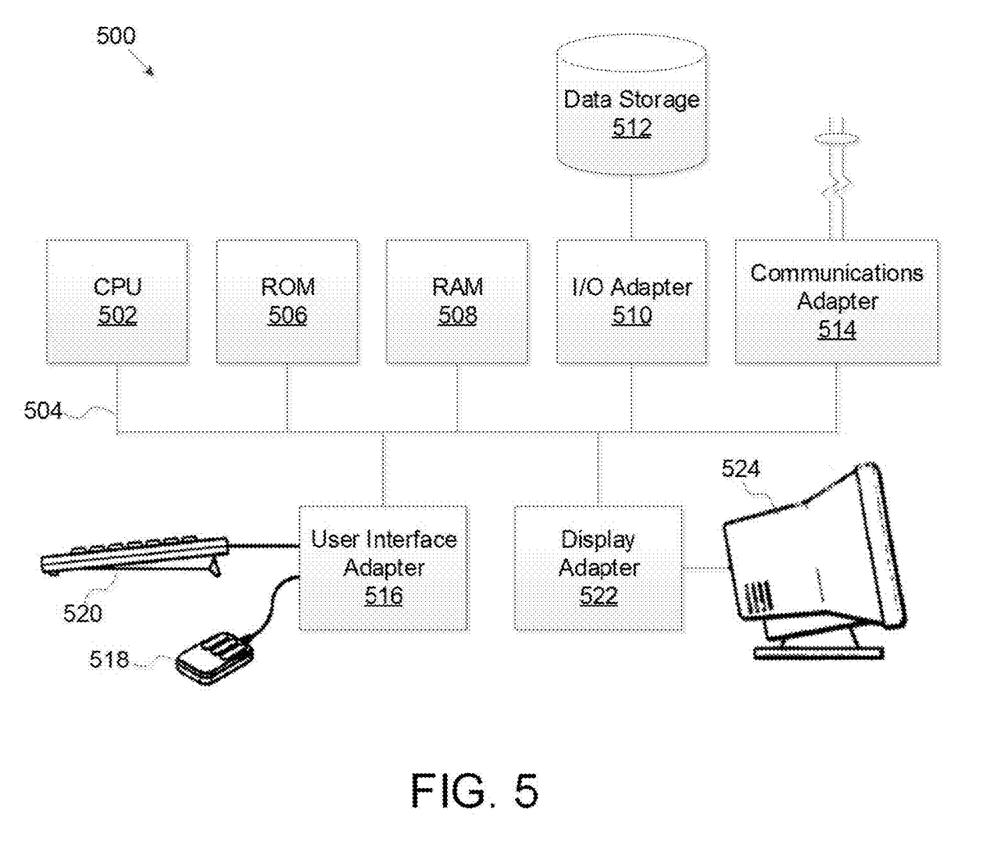
FIG. 5 is a block diagram illustrating a computing system, according to one example embodiment of the disclosure.

FIG. 5 is a block diagram illustrating a computing system 500 with which the architecture 100 and methods 200, 300, 400 can be implemented according to one embodiment of the disclosure. At least one central processing unit ("CPU") 502 is coupled to a system bus 504. The CPU 502 may be a general purpose CPU or microprocessor, graphics processing unit ("GPU"), and/or microcontroller. The present embodiments are not restricted by the architecture of the CPU 502 so long as the CPU 502, whether directly or indirectly, supports the operations as described herein. The CPU 502 may execute the various logical instructions according to the present embodiments.

The computing system 500 may also include random access memory (RAM) 508, which may be synchronous RAM (SRAM), dynamic RAM (DRAM), synchronous dynamic RAM (SDRAM), or the like. The computing system 500 may utilize RAM 508 to store the various data structures used by a software application. The computing system 500 may also include read only memory (ROM) 506 which may be PROM, EPROM, EEPROM, optical storage, or the like. The ROM may store configuration information for booting the computer system 500. The RAM 508 and the ROM 506 hold user and system data, and both the RAM 508 and the ROM 506 may be randomly accessed.

The computing system 500 may also include an I/O adapter 510, a communications adapter 514, a user interface adapter 516, and a display adapter 522. The I/O adapter 510 and/or the user interface adapter 516 may, in certain embodiments, enable a user to interact with the computing system 500. In a further embodiment, the display adapter 522 may display a graphical user interface (GUI) associated with a software or web-based application on a display device 524, such as a monitor or touch screen.

The I/O adapter 510 may couple one or more storage devices 512, such as one or more of a hard drive, a solid state storage device, a flash drive, a compact disc (CD) drive, a floppy disk drive, and a tape drive, to the computing system 500. According to one embodiment, the data storage 512 may be a separate server coupled to the computer system 500 through a network connection to the I/O adapter 510. The communications adapter 514 may be adapted to couple the computing system 500 to a network, which may be one or more of a LAN, WAN, and/or the Internet. The user interface adapter 516 couples user input devices, such as a keyboard 520, a pointing device 518, and/or a touch screen (not shown) to the computer system 500. The display adapter 522 may be driven by the CPU 502 to control the display on the display device 524. Any of the devices 502-522 may be physical and/or logical.

The applications of the present disclosure are not limited to the architecture of computing system 500. Rather the computing system 500 is provided as an example of one type of computing device that may be adapted to perform the functions. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 400 may be virtualized for access by multiple users and/or applications.

A "data connection" is an electronic connection that communicates electronic information, which may include digital and/or analog data. A data connection may be done through a wired connection, e.g., USB, Ethernet, local area network, etc. A data connection may be done through a wireless connection, e.g., IEEE 802.11x (Wi-Fi), long term evolution (4G LTE), or the like. The data connection may be secured, e.g., encrypted, communication. The data connection may be unsecured, e.g., clear text, communication. In this specification, if not otherwise specified, the term "data connection" includes both secured and unsecured communications. When the communication is specified as "secured data connection," it refers to encrypted communication, where any encryption/decryption methodology can be applied, including Stealth.

If implemented in firmware and/or software, the functions described above may be stored as one or more instructions or code on a computer-readable medium. Examples include non-volatile computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A voice check-in platform, comprising:
    a salon application associated with a voice capable device having a location near a user, wherein a user submits a request for an appointment for a salon service via voice input provided at the voice capable device;
    a salon services API in communication with the salon application, having a first booking engine including available appointments and a location service for finding a salon nearby the user, the salon services API matching the request to an available appointment at a location nearby the user and sending the available appointment to the salon application for confirmation by the user via a vocal interaction with the voice capable device;
    a serverless backend computing system having a second booking engine, wherein upon receiving confirmation by the user via the vocal interaction, the salon services API submits a booking request to the second booking engine for booking the appointment with the salon;
    a gateway API between the salon services API and the serverless backend computing system for throttling an amount of data and rate of data the serverless backend computing system can receive from the salon services API in order to maintain computing efficiency on the serverless backend computing system;
    a dynamic database configured to store appointments using unstructured data to store cache configuration files, wherein when the gateway API receives a request, the gateway API is configured to access a cache configuration file from the dynamic database specific for the request;
    a database interface in communication with the second booking engine for storing the appointment in the dynamic database, and upon storing the appointment sending an update to the first booking engine removing the available appointment;
    wherein the first booking engine contains updated available appointments such that it can respond to requests by users for services without communicating with the serverless backend computing system until the user confirms the appointment to maintain efficiency on the serverless backend computing system.

2. A voice check-in platform according to claim 1, further comprising a pay service in communication with the salon application.

3. A voice check-in platform according to claim 1, further comprising a demand generation platform in communication with the salon application.

4. A voice check-in platform according to claim 1, wherein the second booking engine pulls a configuration file from the dynamic database specific for the request.

5. A voice check-in platform according to claim 1, wherein the configuration file includes a user identity, a service item, a price, a stylist identity, and an identity and location of the salon.

6. A voice check-in platform according to claim 1, wherein the salon application resides on a user device and the user device receives the updated available appointments from the second booking engine at regular intervals without requesting the updated available appointments.

7. A method of using a voice check-in platform, the method including instructions, when executed by a processor, cause the processor to execute actions comprising:

receiving, by a first processor of a serverless backend system comprising a gateway API, a request received via an associated voice capable device for booking an appointment for a service provided by a salon, wherein the first processor is a processor of a device, wherein the device includes machine readable memory accessible by the first processor;

wherein when the gateway API receives the request, the gateway API is configured to access a cache configuration file from a dynamic database specific for the request, wherein the dynamic database is configured to store appointments using unstructured data to store cache configuration files;

finding a salon and service, by the first processor in response the request using a salon service API running on the serverless backend system;

providing, by the first processor, a suggested booking for the salon and service via an associated voice capable device;

upon receiving, by the first processor, a confirmation from the user via a vocal interaction with the voice capable device, sending a request to a second processor to book the salon and service through the gateway API that controls the amount of data and rate of data that can be send to the second processor to maintain efficiency; and booking the salon and service by the second processor, storing the booking in the dynamic database, and sending an update of available appointments to the first processor;

wherein the first processor can respond to the request without communicating with the second processor until the confirmation is received from the user.

8. A method according to claim 7, further comprising after providing a suggested booking, determining by the first processor a user response and if the user response included a confirmation from the user, booking the salon service.

9. A method according to claim 8, wherein determining a user response includes if the user response included a request for a different location, then determining by the first processor alternative nearby salons for the booking.

10. A method according to claim 9, wherein determining a user response includes if the user response included a request for a different time, then determining by the first processor alternative times for the booking.

11. A method according to claim 7, further comprising determining by the first processor if the user has booked through the system before and if the user has booked through the system before, using prior booking information at least in part to find a salon and service.

12. A method according to claim 11, wherein determining if the user has booked before includes if the user has not booked through the system before, prompting the user for the user's current location.

13. A method according to claim 11, wherein determining if the user has booked through the system before includes using a user identification to determine if the user has booked through the system before.

* * * * *